L. B. POWERS.
INLET VALVE FOR FLUSH TANKS.
APPLICATION FILED MAY 24, 1917.
1,241,656.
Patented Oct. 2, 1917.
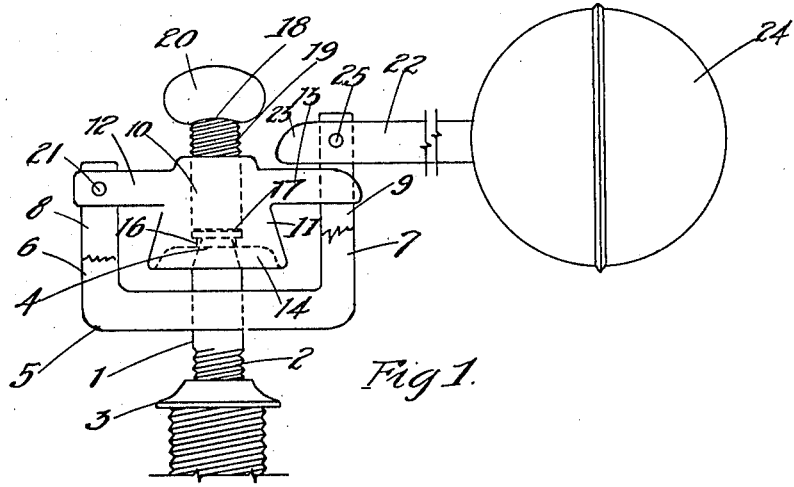
INVENTOR.
Luther B. Powers
BY E. E. Rodabaugh
ATTORNEYS.

UNITED STATES PATENT OFFICE.

LUTHER B. POWERS, OF SAN DIEGO, CALIFORNIA.

INLET-VALVE FOR FLUSH-TANKS.

1,241,656.  Specification of Letters Patent.  Patented Oct. 2, 1917.

Application filed May 24, 1917. Serial No. 170,591.

*To all whom it may concern:*

Be it known that I, LUTHER B. POWERS, a citizen of the United States, residing at San Diego, in the county of San Diego and State of California, have invented certain new and useful Improvements in Inlet-Valves for Flush-Tanks, of which the following is a clear, full, and exact description, such as will enable others skilled in the art to which it relates to make and use the same.

My invention relates to an inlet valve for flush tanks.

The object of my invention is to provide a simple, durable and inexpensive valve of the kind which may be easily adjusted to regulate the supply of water into the tank, which can be easily taken apart for the purpose of repair or cleaning, and in which the worn-out parts may be easily replaced by new or unworn parts, and to provide a packing member that has no bolts, screws or other materials inserted into or through it.

For these objects my invention consists of the combination of parts and forms of construction which will be hereafter fully described, set forth and claimed.

In the accompanying drawings Figure 1 is a front elevational view of my invention showing in broken section the float; Fig. 2 is a vertical partly sectional view of same; Fig. 3 is a perspective detail view of the collar member, and Fig. 4 is a perspective detail view of the shut-off member.

In the drawings the numeral 1 is the feed pipe which is provided on its lower end with a threaded portion 2, which is adapted to be held in position in the tank by means of the threaded nut 3. The feed pipe 1 is provided at its upper end with a tapering portion 4 which will be referred to later. Mounted on the pipe 1, approximately midway between the tapering portion 4 and the nut 3 is a collar 5, having oppositely disposed upwardly extending arms 6 and 7, having respectively bifurcated ends 8 and 9, the walls of which are apertured. The shut-off member 10 is provided with a cone-shaped portion 11 and two oppositely disposed arm portions 12 and 13, and is provided on its lower surface with a concave chamber 14, and it has a circular bore provided with threads 15 and an annular projection 16. A gasket 17 made of rubber or other flexible material is placed in the threaded bore and rests on the annular projection 16. The member 18 is provided with a threaded surface 19 which is adapted to fit into the thread 15 of the bore in the shut-off member 10, and is adapted to be screwed down in said bore against the gasket 17 so as to hold said gasket 17 firmly on the annular projection 16.

The member 18 is also provided with a flat portion 20 to facilitate its revolution. The arm 12 is pivotally mounted at 21 in the aperture in arm 6 and the arm 13 extends through the slot in arm 7 so as to be guided thereby. A float rod or lever 22 is pivotally mounted at 23 in the arm 7 above the arm 13. The float lever 22 comprises a short arm 23 and a long arm carrying a float 24. The tapering portion 4 of the feed pipe 1 is adapted to permit the water to escape freely when the shut-off member 10 is raised so that the gasket 17 is removed from the top of the feed pipe 1.

In operation, when the tank is being emptied of its contents the float 24 will lower with the water, and the portion 23 of the float rod 22 will rise, and the pressure of the water in the feed pipe 1 will force the shut-off member 10 upwardly, and the water will flow into the tank and continue to flow therein until the water in the tank will cause the float 24 to rise to a sufficient height to cause the portion 23 to press downwardly on the arm 13 thereby causing the gasket 17 to close the opening from the feed pipe 1.

If it is desired for any reason to remove the gasket 17 this can be very quickly and easily done by unscrewing the member 18, when the gasket 17 can be lifted out by the use of the knife-blade or other like instrument.

Having thus described my invention, what I claim is:

The combination with an inlet pipe for a flush tank of a shut off member having a cone-shaped portion, two oppositely disposed arm portions, a bore through said cone-shaped portion and an annular projection at the bottom of said bore, a gasket adapted to fit in said bore on said annular projection, a threaded member adapted to be screwed into said threaded bore and hold said gasket firmly against said annular projection, a collar member carried by the inlet pipe and having two oppositely disposed upwardly extended arms, in one of which said arms one of the arms of said shut off member is pivotally mounted, and in the other the other arm of said shut off member is guided, means pivotally mounted on said last-mentioned arm for engaging the valve and automatically closing said feed pipe by the rise of the water in said flush tank.

In testimony whereof I have hereunto subscribed my name in the presence of two subscribing witnesses.

LUTHER B. POWERS.

Witnesses:
E. E. RODABAUGH,
MINNIE KORTE.

Copies of this patent may be obtained for five cents each, by addressing the "Commissioner of Patents, Washington, D. C."